Jan. 16, 1968   J. R. GRAYSON   3,363,642
CONTROL VALVE RESPONSIVE TO FLUIDS OF DIFFERENT DENSITIES
Filed Aug. 24, 1964   2 Sheets-Sheet 1
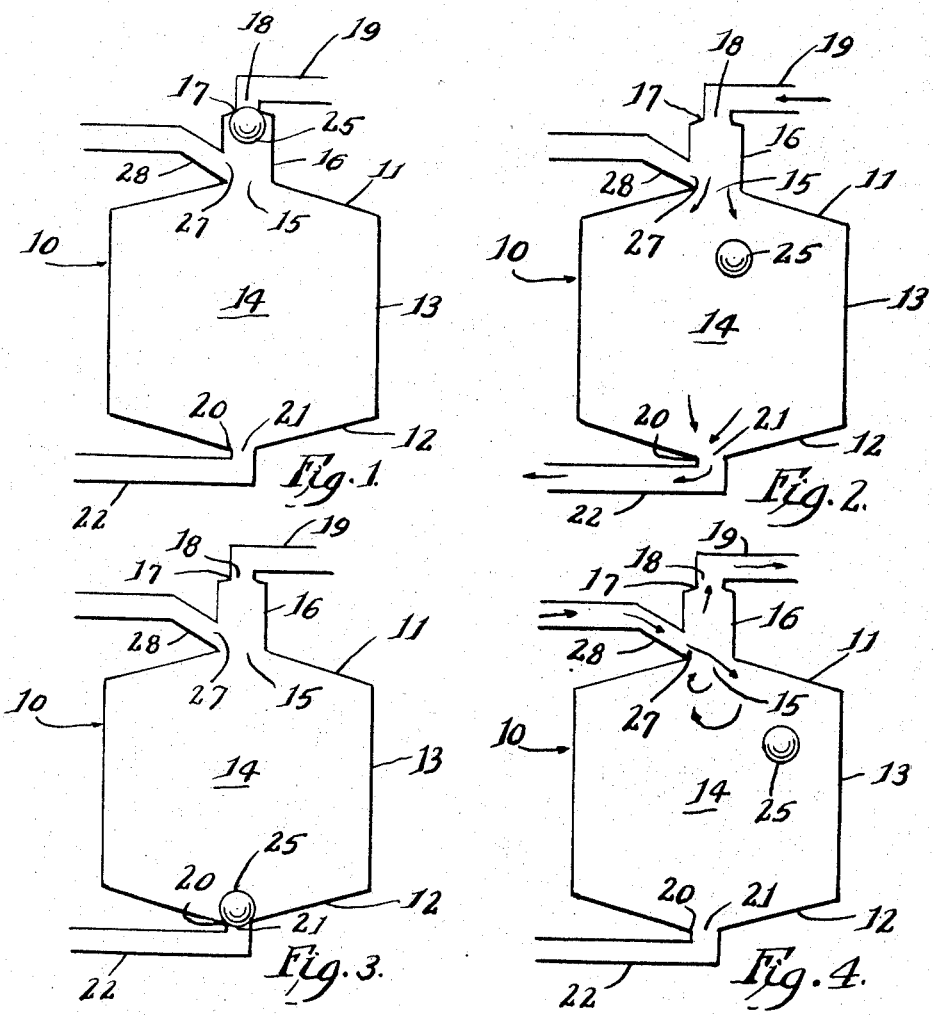
Inventor.
John R. Grayson.
By. Zabel, Baker, York
Jones and Dithmar
Attorneys.

Jan. 16, 1968   J. R. GRAYSON   3,363,642
CONTROL VALVE RESPONSIVE TO FLUIDS OF DIFFERENT DENSITIES
Filed Aug. 24, 1964   2 Sheets-Sheet 2

Inventor.
John R. Grayson.
By Zabel, Baker, York
Jones and Dithmar
Attorneys.

United States Patent Office 3,363,642
Patented Jan. 16, 1968

3,363,642
CONTROL VALVE RESPONSIVE TO FLUIDS
OF DIFFERENT DENSITIES
John R. Grayson, Arlington Heights, Ill.
(1950 E. Estes Ave., Elk Grove Village, Ill. 60007)
Filed Aug. 24, 1964, Ser. No. 391,628
7 Claims. (Cl. 137—399)

This invention relates to a control valve responsive to fluids of different densities, and more particularly to a valve that prevents the flow of higher density fluid in one direction through the valve unless lower density fluid previously has been flowing for a short time in the opposite direction.

The valve of the invention will find use in zeolite water softening devices to prevent refilling of the brine tank until the tank previously has been emptied of brine. In this example the fluids of different density to which the valve is responsive are water and air.

The valve also is suitable for use in dish-washing apparatus to prevent the entry of spray or rinse water unless the container previously has been emptied of wash water. The valve similarly lends itself to use in laundry equipment.

In broader aspect, the valve may be used in any apparatus wherein a container alternately is filled with liquid and emptied of its liquid, or where two gases, or two liquids, or a gas and a liquid are separated, the heavier from the lighter, before re-introduction of one of them.

One object of the invention, therefore, is to provide a simple, low-cost and effective control valve that is responsive, as far as direction of flow therethrough is concerned, to two fluids of different densities. As mentioned, such a valve, among other things, prevents the flow of higher density fluids in one direction unless lower density fluid previously has been flowing for a short time in the opposite direction.

Another object of the invention is to provide a valve for a water softening device that prevents the brine tank from being refilled with fresh water prior to the time the tank has been emptied completely of brine.

Yet another object is to provide an auxiliary valve for a water softening device that functions as an emergency shut-off to prevent unwanted flow of fresh water into the brine tank such as would occur in the event of leak in the main valve of the device. The valve also prevents air from entering the softening tank after the brine tank has been emptied.

Other objects, advantages and details of the invention will be apparent as the description proceeds, reference being had to the accompanying drawings wherein two forms of the invention are shown. It is to be understood that the description and drawings are exemplary only, and that the scope of the invention is to be measured by the appended claims.

In the drawings:

FIG. 1 is a diagrammatic longitudinal sectional view of a control valve embodying the invention, the movable part of the valve shown in the position occupied when higher density fluid in the valve is in a state of repose.

FIG. 2 is a similar view showing the position of the movable part when higher density fluid is in a state of flow from right to left.

FIG. 3 is a similar view showing the position of the movable part after lower density fluid has entered the valve.

FIG. 4 is a similar view showing the position of the movable part when heavier density fluid is flowing from left to right.

Figure 7:
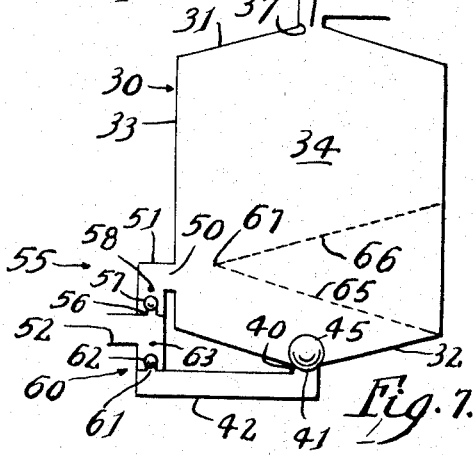

FIG. 7 has a similar view showing the movable parts in positions occupied when lower density fluid is contained within the valve.

Figure 8:
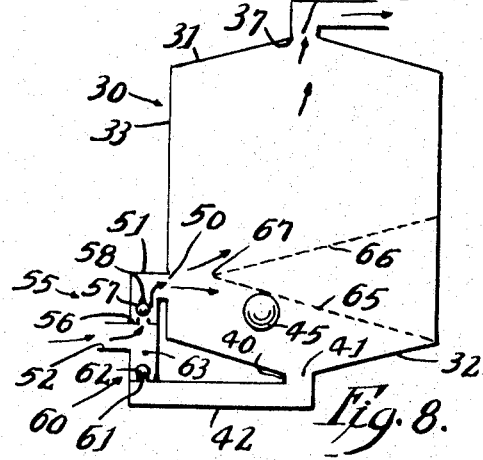

FIG. 8 is a similar view showing the movable parts in positions occupied when higher density fluid is flowing from left to right.

Referring now to the drawings, and particularly to FIGS. 1-4, the illustrated form of the invention includes a housing 10 which may be of any suitable shape in transverse section, for example, circular.

As shown in FIGS. 1-4, housing 10 has an upwardly tapering top portion 11, a downwardly tapering bottom portion 12 and a side portion 13 connecting the top and bottom portions, the several portions enclosing a space 14 adapted to be filled successively with two fluids of significantly different densities.

The uppermost part of top portion 11 has an opening 15 that connects with a vertically extending duct 16, the latter terminating in a first seat 17 that surrounds a first port 18. An external duct 19 leads away from port 18, and, in a water softening device application, connects with a brine tank (not shown).

The lowermost part of bottom portion 12 has a second seat 20 surrounding a second port 21. An external duct 22 leads away from port 21, and, in a water softening device, connects with the softening tank to conduct brine from the valve to the tank.

The movable part of the valve shown in FIGS. 1-4 is a spherical ball 25 of material having a density intermediate the densities of the two fluids the valve is designed to accommodate. Ball 25 is of such size as to engage seats 17 and 20 in sealing manner. As will be understood, ball 25 floats in the fluid of higher density, thereby sealing itself with first seat 17, and sinks in the fluid of lower density, thereby sealing itself with second seat 20. Thus, in one valve condition, ball 25 closes first port 18, and, in another condition, closes second port 21.

Describing the operation of the valve as set forth so far, FIG. 1 illustrates the position of ball 25 when housing 10 is filled with higher density fluid and there is no fluid flow into or through the valve. It will be noted that ball 25 is forced upwardly into sealing engagement with seat 17, thereby closing port 18 and preventing outward flow from housing 10 through duct 19. When the valve is installed in a water softening device, duct 19 leads to the lower portion of the brine tank and duct 22 leads to the main valve and softening tank of the device, as previously mentioned.

When the main valve of the device calls for brine from the brine tank, a low pressure condition is created in duct 22, and fluid from the brine tank flows from right to left through the valve as indicated by the arrows in FIG. 2. The flow in this direction causes ball 25 to move away from first seat 17, as shown in FIG. 2. This flow continues until the brine tank is exhausted of brine, at which time air from the brine tank enters and fills housing 10. This air, of course, is the previously mentioned fluid of lower density encountered by the valve in a water softening device.

Since ball 25 has greater density than air, the ball falls or sinks to the bottom of housing 10, as shown in FIG. 3, and seals itself with second seat 20, thereby closing second port 21 and preventing air from being drawn into the softening tank through duct 22. This short-duration flow of air into the valve in right to left direction is the previously referred to flow of lower density fluid that is prerequisite to the succeeding left to right flow of higher density fluid.

The valve of the invention also includes means restraining ball 25 from returning to first seat 17 until termination of the flow of higher density fluid through the valve in left to right direction, that is, the flow direction of fresh water that refills the brine tank.

In the form of the invention shown in FIGS. 1–4, this restraining means comprises an inlet port means 27 and an associated inlet duct 28. Port means 27 is located in vertically extending duct 16, as shown, and associated duct 28 has a directional characteristic that causes the incoming fluid to flow downwardly in housing 10. After housing 10 is filled with incoming higher density fluid from port 27, the fluid flows out of housing 10 through duct 16, first port 18 and external duct 19, the flow being from left to right, as shown in FIG. 4.

The flow of incoming fluid in downwardly direction in housing 10, as indicated by the arrows in FIG. 4, prevents or restrains ball 25 from floating upwardly into sealing engagement with first seat 17. Thus, first port 18 remains open until termination of fluid flow through duct 28 and port 27.

External means such as the main valve of the water softening device eventually stops the flow in duct 28 and when this occurs, ball 25 floats upwardly and closes port 18, as shown in FIG. 1.

From the above description, it is seen that the valve prevents the flow of higher density fluid in one direction (from left to right) until there previously has been a flow of lower density fluid for a short time in the opposite direction (the flow of air from right to left).

A modified form of valve embodying the invention is shown in FIGS. 5–8. In general, this form is similar to the one previously described except that a somewhat different means is used for restraining travel of the ball element, as will be seen.

Briefly, the valve of FIGS. 5–8 comprises a housing 30 having an upwardly tapering top portion 31, a downwardly tapering bottom portion 32 and a side portion 33 connecting the top and bottom portions. The several portions enclose space 34.

The uppermost part of top portion 31 has a first seat 37 that surrounds a first port 38. An external duct 39 leads away from port 38. Similarly, the lowermost part of bottom portion 32 has a second seat 40 surrounding a second port 41. An external duct 42 leads away from port 41.

One movable part of the valve is a spherical ball 45 of material having a density intermediate the densities of the two fluids the valve is designed to accommodate. Ball 25 is of such size as to engage seats 37 and 40 in sealing manner, closing ports 38 and 41.

The parts of the valve so far described function in generally the same manner as the corresponding parts of the valve shown in FIGS. 1–4. As mentioned, the main difference between the two valves resides in the restraining means for ball 45 which now will be described.

Side portion 33 of housing 30 has an inlet port means 50 to which is connected a short duct 51 that leads to a common duct 52. Previously mentioned duct 42 from second port 41 also leads to common duct 52.

Short duct 51 is provided with a one-way valve 55 permitting liquid to flow toward, but not away from, inlet port means 50. As shown, valve 55 includes a seat 56, a floating ball 57 and a retaining pin 58 for ball 57.

Similarly, duct 42 is provided with a one-way valve 60 comprising a seat 61, a floating ball 62, and a retaining pin 63 for ball 62. This valve permits fluid flow from, but not toward, second port 41, as will be understood.

The restraining means also include a pair of generally transverse screens 65 and 66 in housing 30. These screens are adjacent to each other at a region 67 that is spaced laterally from the upper level of inlet port means 50 by a distance permitting passage of ball 45 between region 67 and the adjacent housing side portion. Screens 65 and 66 diverge from each other, one upwardly and the other downwardly from region 67, and extend into ball-blocking proximity with other parts of side portion 33.

As will be understood, the only travel path of ball 45 between the upper and lower parts of housing 30 includes the space between region 67 and inlet port means 50 in side portion 33.

Figure 5:
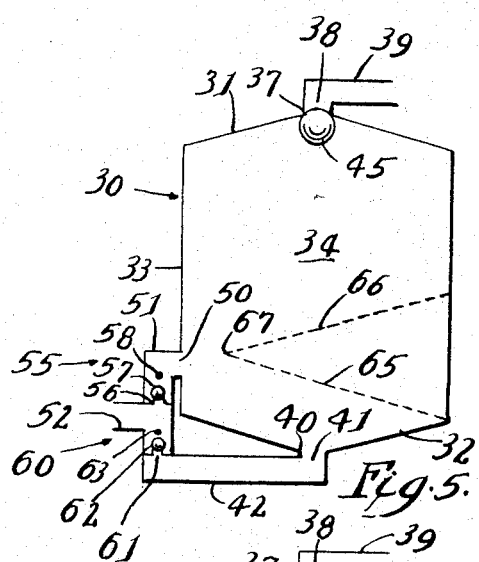
FIG. 5 is a diagrammatic longitudinal sectional view of a modified form of control valve embodying the invention, the movable parts shown in positions occupied when higher density fluid in the valve is in a state of repose.
Figure 6:
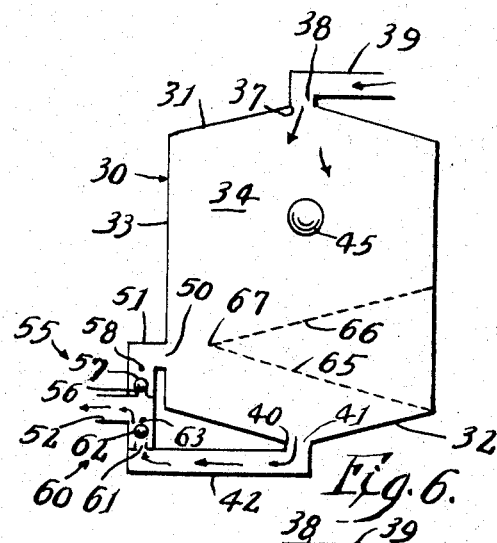
FIG. 6 is a similar view of the modified valve showing the movable parts in the positions occupied when density fluid is in a state of flow from right to left.

When higher density liquid is flowing from right to left through the valve, as indicated by the arrows in FIG. 6, ball 45 is forced away from first seat 37, permitting the fluid to enter housing 30. The fluid exits through port 41, associated duct 42, one-way valve 60 and common duct 52.

When the flow of higher density fluid from right to left terminates, air or other density fluid enters the valve through first port 38 and fills housing 30, causing ball 45 to fall or sink to the bottom of the housing. As mentioned, ball 45 passes through the space between region 67 and inlet port means 50. Ball 45, of course, seals itself with second seat 40 and closes second port 41, thereby preventing air flow into ducts 42 and 52. FIG. 7 shows the positions of the movable parts for the valve condition just described.

During the right to left flow period described above, there is no outward flow of either higher or lower density fluid through port means 50 because associated short duct 51 is closed by one-way valve 55.

As there has been a preceding flow of lower density fluid in the valve for a short time from right to left, the valve now is in condition to pass higher density fluid from left to right. The positions of the movable parts for this condition are shown in FIG. 8 with the flow path indicated by arrows. Incoming fluid in duct 52 is blocked from entering duct 42 by one-way valve 60, and thus is directed into short duct 51. One-way valve 55 in this duct permits the fluid to enter inlet port means 50, and it will be recalled that this port means is generally aligned with screen region 67.

The flow of incoming fluid holds ball 45 beneath lower screen 65, as shown in FIG. 8, until the flow of incoming fluid terminates. At this time, ball 45 floats upwardly through the space between region 67 and inlet port means 50 and seals itself with first seat 37, thereby closing first port 38 and completing a cycle of valve operation.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A control valve responsive to fluids of different densities preventing the flow of higher density fluid in one direction unless lower density fluid previously has been flowing for a short time in the opposite direction, comprising:

a housing having an upwardly tapering top portion, a downwardly tapering bottom portion and a side portion enclosing a space adapted to be filled successively with two fluids of different densities;

a first seat surrounding a first port at the uppermost part of said top portion;

a first external duct leading from said first port and adapted to pass lower density fluid into said housing and higher density fluid out of said housing;

a second seat surrounding a second port at the lowermost part of said bottom portion;

a second external duct leading from said second port and adapted to pass higher density fluid out of said housing;

a ball of density intermediate the densities of said two fluids within said housing, said ball sealing with said first seat when said housing contains non-flowing fluid of higher density and sealing with said second seat when said housing contains fluid of lower density; and means restraining said ball from returning to said first seat from said second seat during the flow of the higher density fluid through said housing in said one direction and permitting said ball to return to said first seat when said flow terminates, said means including a third external duct leading into said housing and directing a stream of higher density fluid into said housing at said ball whereby said stream cooperates to restrain said ball from returning to said first seat.

2. The combination of claim 1 wherein said restraining means comprises an inlet port means for the flow of said higher density fluid in said one direction into said housing, said inlet port means connected to said third external duct and located adjacent said first seat whereby the flow of incoming fluid urges said ball away from said first seat.

3. The combination of claim 1 wherein said restraining means comprises an inlet port means for the flow of said higher density fluid in said one direction into said housing, said inlet port means connected to said third external duct and located in said housing side portion, and a pair of generally transverse screens in said housing, said screens adjacent to each other at a region spaced laterally from the upper level of said inlet port means by a distance permitting passage of said ball between said region and the adjacent housing side portion, said screens diverging from each other, one upwardly and the other downwardly from said region, and extending into ball-blocking proximity with other parts of said side portion, whereby said ball in the presence of lower density fluid drops below said screens and is held in such position until flow of higher density fluid through said inlet port means terminates.

4. The combination of claim 3 with the addition of a one-way valve in said third external duct permitting fluid flow in said one direction.

5. The combination of claim 4 with the addition of a one-way valve in said second external duct permitting fluid flow in said opposite direction.

6. A control valve responsive to fluids of different densities preventing the flow of higher density fluid in one direction unless lower density fluid previously has been flowing for a short time in the opposite direction, comprising:

means defining a housing enclosing a space, said housing having first and second ports at uppermost and lowermost locations;

first and second seats in effective relation with said first and second ports respectively;

a first external duct leading from said first port and adapted to pass lower density fluid into said housing and higher density fluid out of said housing;

a second external duct leading from said second port and adapted to pass higher density fluid out of said housing;

a ball of density intermediate the densities of said two fluids within said housing, said ball sealing with said first seat when said housing contains non-flowing fluid of higher density and sealing with said second seat when said housing contains fluid of lower density; and means restraining said ball from returning to said first seat from said second seat during the flow of the higher density fluid through said housing in said one direction and permitting said ball to return to said first seat when said flow terminates, said means including a third external duct leading into said housing and directing a stream of higher density fluid into said housing at said ball whereby said stream cooperates to restrain said ball from returning to said first seat.

7. The combination of claim 6 wherein said restraining means comprises an inlet port means for the flow of higher density fluid in said one direction into said housing, said inlet port means connected to said third external duct and located adjacent said first seat whereby the flow of incoming fluid urges said ball away from said first seat, said ball sealing with said seat when the incoming flow terminates.

References Cited
UNITED STATES PATENTS

| 763,115 | 6/1904 | Robinson | 137—399 |
| 3,202,174 | 8/1965 | Rudelick | 137—399 X |
| 3,237,640 | 3/1966 | Whitlock et al. | 137—399 |

WILLIAM F. O'DEA, *Primary Examiner.*

D. R. MATTHEWS, *Assistant Examiner.*